US012675645B2

(12) United States Patent
Davis

(10) Patent No.: US 12,675,645 B2
(45) Date of Patent: Jul. 7, 2026

(54) SYSTEM AND METHOD FOR AUTOMATED LOCALIZATION OF SOFTWARE APPLICATIONS AND USER INTERFACES

(71) Applicant: ORACLE INTERNATIONAL CORPORATION, Redwood Shores, CA (US)

(72) Inventor: Edmund Alex Davis, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 366 days.

(21) Appl. No.: 18/236,212

(22) Filed: Aug. 21, 2023

(65) Prior Publication Data

US 2024/0242038 A1 Jul. 18, 2024

Related U.S. Application Data

(60) Provisional application No. 63/439,785, filed on Jan. 18, 2023.

(51) Int. Cl.
*G06F 40/40* (2020.01)

(52) U.S. Cl.
CPC .................................... *G06F 40/40* (2020.01)

(58) Field of Classification Search
CPC .............................. G06F 40/143; G06F 40/18
See application file for complete search history.

(56) References Cited

U.S. PATENT DOCUMENTS

| | | | |
|---|---|---|---|
| 11,138,371 B2 | 10/2021 | Davis | |
| 11,354,493 B2 | 6/2022 | Von Tish | |
| 11,443,110 B2 | 9/2022 | Davis | |
| 12,260,170 B2 * | 3/2025 | Chen | G06F 16/221 |
| 2006/0294463 A1 * | 12/2006 | Chu | G06F 9/454 |
| | | | 715/703 |

(Continued)

OTHER PUBLICATIONS

Oracle, "Oracle® Cloud Developing Integrated Spreadsheets Using Oracle Visual Builder Add-in for Excel" Version 3.3; F61239-01, Oct. 2022, Copyright © 2021, 2022, 165 pages.

(Continued)

*Primary Examiner* — Marina Lee
(74) *Attorney, Agent, or Firm* — TUCKER ELLIS LLP

(57) ABSTRACT

In accordance with various embodiments, described herein are systems and methods for providing automated localization of software applications and graphical user interfaces. A software extension or add-in component operates both as a design tool, and as a runtime process, for purposes of localizing a software application or its graphical user interface, including the translation of user-visible strings displayable within graphical user interface elements. The translation manager can be used to automate the localization of a software application or workbook being developed, including during an extraction process, automatically identifying and associating user-visible strings with string keys. When the workbook is subsequently accessed and used at runtime, for example by a business user working within a particular region or language, the extension or add-in can use the string keys to automatically map prepared-translations to the graphical user interface elements, for use in localizing the software application.

20 Claims, 12 Drawing Sheets

(56)                    References Cited

U.S. PATENT DOCUMENTS

| 2014/0278347 | A1* | 9/2014 | Luo | G06F 40/40 |
| | | | | 704/3 |
| 2018/0300218 | A1* | 10/2018 | Lipka | G06F 40/58 |
| 2018/0300318 | A1* | 10/2018 | Sittel | G06F 40/58 |
| 2019/0095413 | A1* | 3/2019 | Davis | H04L 67/565 |
| 2020/0097534 | A1 | 3/2020 | Von Tish | |
| 2021/0357582 | A1 | 11/2021 | Davis | |

OTHER PUBLICATIONS

Oracle, "Oracle® Cloud Managing Data Using Oracle Visual Builder Add-in for Excel" Version 3.3; F61240-01, Oct. 2022, Copyright © 2021, 2022, 44 pages.

* cited by examiner

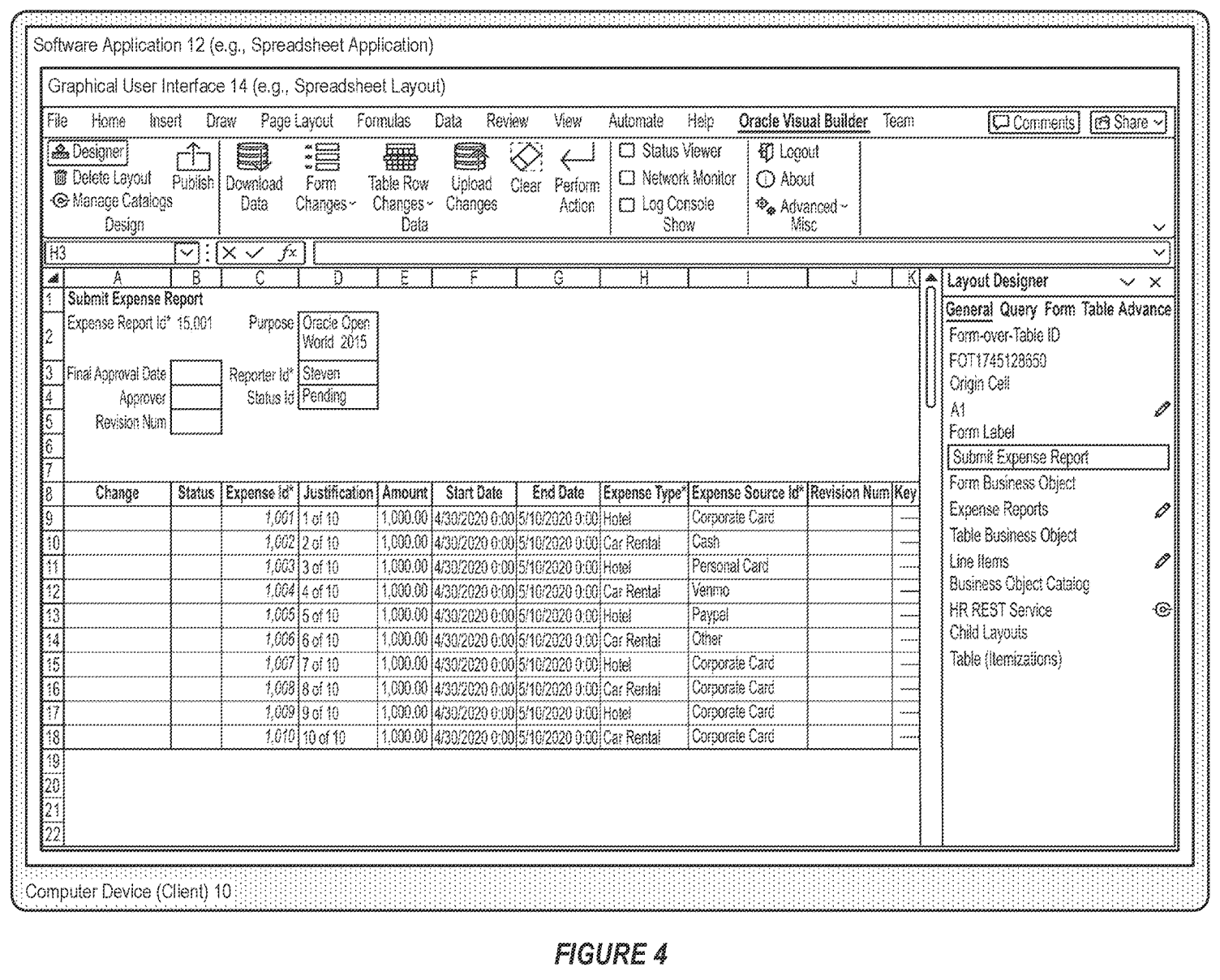

Software Application 12 (e.g., Spreadsheet Application)

Graphical User Interface 14 (e.g., Spreadsheet Layout)

File  Home  Insert  Draw  Page Layout  Formulas  Data  Review  View  Automate  Help  Oracle Visual Builder  Team          Comments  Share ⌄

Designer | Delete Layout | Publish | Manage Catalogs | Design | Download Data | Form Changes ⌄ | Table Row Changes ⌄ | Upload Changes | Clear Changes ⌄ | Perform Action Status Viewer | Network Monitor | Log Console Show | Logout | About | Advanced ⌄ Misc

Layout Designer

General Query  Form  Table  Advance

Form-over-Table ID
FOT1745126650
Origin Cell
A1
Form Label
Submit Expense Report
Form Business Object
Expense Reports
Table Business Object
Line Items
Business Object Catalog
HR REST Service
Child Layouts
Table (Itemizations)

| | A | B | C | D | E | F | G | H | I | J | K |
|---|---|---|---|---|---|---|---|---|---|---|---|
| 1 | Submit Expense Report | | | | | | | | | | |
| 2 | Expense Report Id* 15,001 | | | Purpose | Oracle Open World 2015 | | | | | | |
| 3 | Final Approval Date | | | Reporter Id* | Steven | | | | | | |
| 4 | Approver | | | Status Id* | Pending | | | | | | |
| 5 | Revision Num | | | | | | | | | | |
| 6 | | | | | | | | | | | |
| 7 | | | | | | | | | | | |
| 8 | Change | Status | Expense Id* | Justification | Amount | Start Date | End Date | Expense Type* | Expense Source Id* | Revision Num | Key |
| 9 | | | 1,001 | 1 of 10 | 1,000.00 | 4/30/2020 0:00 | 5/10/2020 0:00 | Hotel | Corporate Card | | |
| 10 | | | 1,002 | 2 of 10 | 1,000.00 | 4/30/2020 0:00 | 5/10/2020 0:00 | Car Rental | Cash | | |
| 11 | | | 1,003 | 3 of 10 | 1,000.00 | 4/30/2020 0:00 | 5/10/2020 0:00 | Hotel | Personal Card | | |
| 12 | | | 1,004 | 4 of 10 | 1,000.00 | 4/30/2020 0:00 | 5/10/2020 0:00 | Car Rental | Venmo | | |
| 13 | | | 1,005 | 5 of 10 | 1,000.00 | 4/30/2020 0:00 | 5/10/2020 0:00 | Hotel | Paypal | | |
| 14 | | | 1,006 | 6 of 10 | 1,000.00 | 4/30/2020 0:00 | 5/10/2020 0:00 | Car Rental | Other | | |
| 15 | | | 1,007 | 7 of 10 | 1,000.00 | 4/30/2020 0:00 | 5/10/2020 0:00 | Hotel | Corporate Card | | |
| 16 | | | 1,008 | 8 of 10 | 1,000.00 | 4/30/2020 0:00 | 5/10/2020 0:00 | Car Rental | Corporate Card | | |
| 17 | | | 1,009 | 9 of 10 | 1,000.00 | 4/30/2020 0:00 | 5/10/2020 0:00 | Hotel | Corporate Card | | |
| 18 | | | 1,010 | 10 of 10 | 1,000.00 | 4/30/2020 0:00 | 5/10/2020 0:00 | Car Rental | Corporate Card | | |
| 19 | | | | | | | | | | | |
| 20 | | | | | | | | | | | |
| 21 | | | | | | | | | | | |
| 22 | | | | | | | | | | | |

Computer Device (Client) 10

*FIGURE 4*

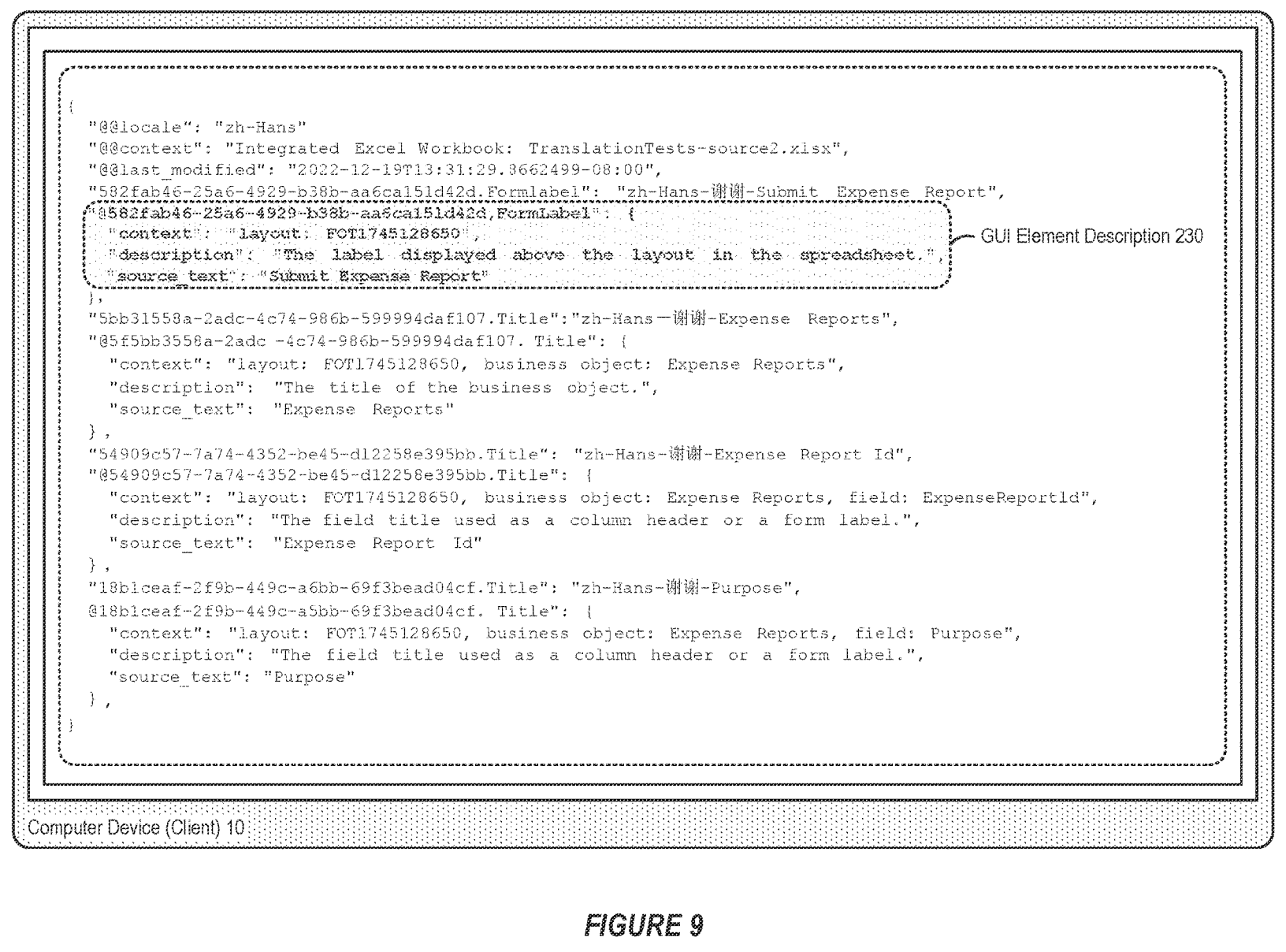

GUI Element Description 230

Computer Device (Client) 10

```
"@locale": "zh-Hans",
"@context": "Integrated Excel Workbook: TranslationTests-source2.xlsx",
"@last_modified": "2022-12-19T13:31:29.8662499-08:00",
"582fab46-25a6-4929-b38b-aa6ca15ld42d.FormLabel": "zh-Hans-谢谢-Submit Expense Report",
"@582fab46-25a6-4929-b38b-aa6ca15ld42d.FormLabel": {
    "context": "layout: FOT1745128650",
    "description": "The label displayed above the layout in the spreadsheet.",
    "source_text": "Submit Expense Report"
},
"5bb31558a-2adc-4c74-986b-599994daf107.Title":"zh-Hans-谢谢-Expense Reports",
"@5f5bb3558a-2adc-4c74-986b-599994daf107.Title": {
    "context": "layout: FOT1745128650, business object: Expense Reports",
    "description": "The title of the business object.",
    "source_text": "Expense Reports"
},
"54909c57-7a74-4352-be45-d12258e395bb.Title": "zh-Hans-谢谢-Expense Report Id",
"@54909c57-7a74-4352-be45-d12258e395bb.Title": {
    "context": "layout: FOT1745128650, business object: Expense Reports, field: ExpenseReportId",
    "description": "The field title used as a column header or a form label.",
    "source_text": "Expense Report Id"
},
"18b1ceaf-2f9b-449c-a6bb-69f3bead04cf.Title": "zh-Hans-谢谢-Purpose",
"@18b1ceaf-2f9b-449c-a5bb-69f3bead04cf.Title": {
    "context": "layout: FOT1745128650, business object: Expense Reports, field: Purpose",
    "description": "The field title used as a column header or a form label.",
    "source_text": "Purpose"
},
```

*FIGURE 9*

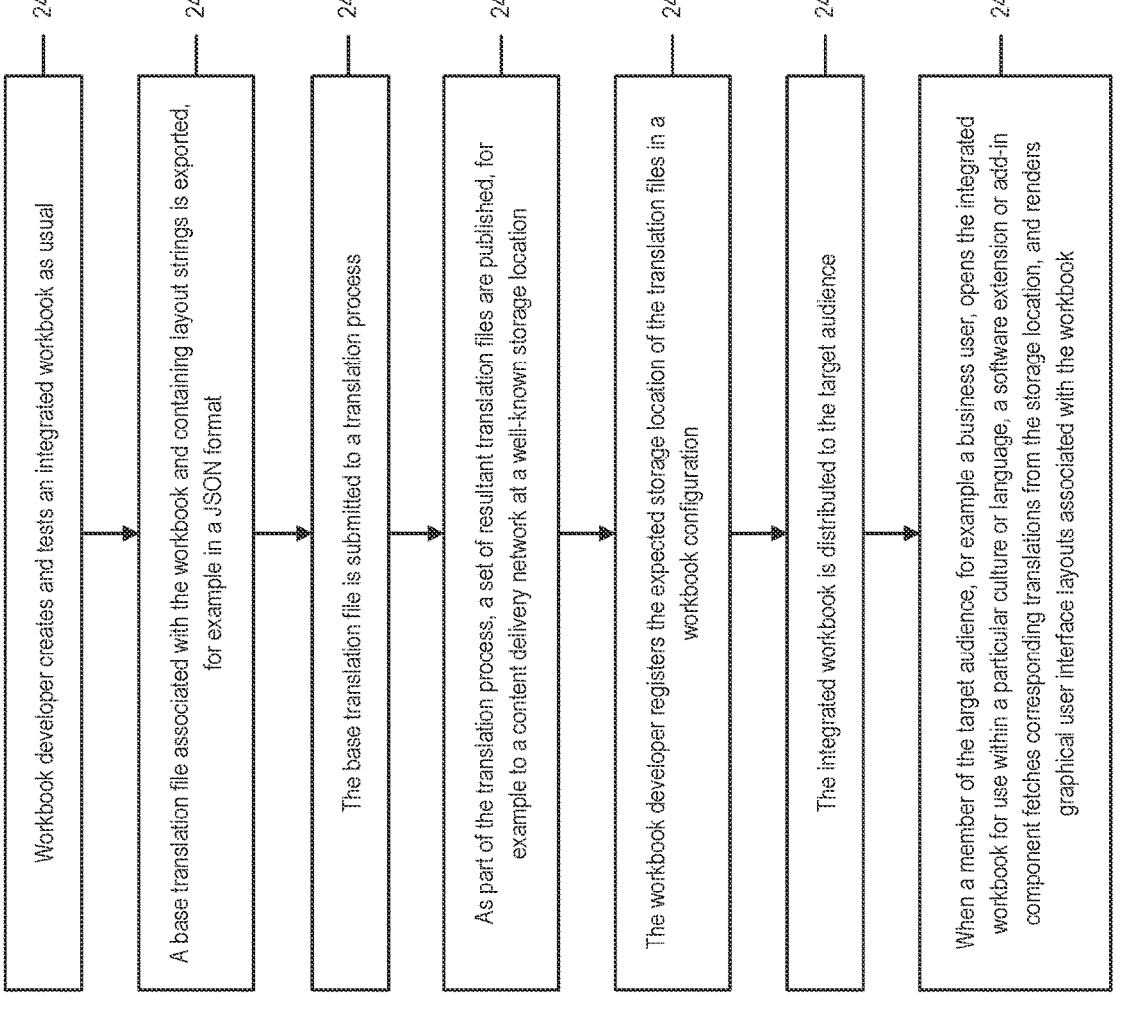

241 Workbook developer creates and tests an integrated workbook as usual

242 A base translation file associated with the workbook and containing layout strings is exported, for example in a JSON format 243 The base translation file is submitted to a translation process 244 As part of the translation process, a set of resultant translation files are published, for example to a content delivery network at a well-known storage location 245 The workbook developer registers the expected storage location of the translation files in a workbook configuration 246 The integrated workbook is distributed to the target audience 247 When a member of the target audience, for example a business user, opens the integrated workbook for use within a particular culture or language, a software extension or add-in component fetches corresponding translations from the storage location, and renders graphical user interface layouts associated with the workbook

*FIGURE 12*

SYSTEM AND METHOD FOR AUTOMATED LOCALIZATION OF SOFTWARE APPLICATIONS AND USER INTERFACES

CLAIM OF PRIORITY AND CROSS-REFERENCE TO RELATED APPLICATIONS

The present application claims the benefit of priority to U.S. Provisional Patent Application titled "SYSTEM AND METHOD FOR AUTOMATED LOCALIZATION OF SOFTWARE APPLICATIONS AND USER INTER-FACES", Application No. 63/439,785, filed Jan. 18, 2023; and is related to U.S. Patent Application titled "EDITABLE TABLE IN A SPREADSHEET INTEGRATED WITH A WEB SERVICE", U.S. patent application Ser. No. 16/145,029, filed Sep. 27, 2018, and subsequently issued as U.S. Pat. No. 11,138,371 on Oct. 5, 2021; each of which above patent applications and patents, together with the contents thereof, are herein incorporated by reference.

COPYRIGHT NOTICE

TECHNICAL FIELD

Embodiments described herein are generally related to software application development, and are particularly directed to a system and method for providing automated localization of software applications and graphical user interfaces.

BACKGROUND

Today's software applications are increasingly used internationally, by large numbers of users distributed across many countries or geographic regions, each of which may have their own working language.

To better support such users, it has become a common requirement for software applications to be able to display their graphical user interface in the user's local language.

However, traditional approaches to software application localization are generally tedious, requiring much additional work on the part of the application developer, while being prone to error in preparing the translation and subsequent display of graphical user interface elements.

SUMMARY

In accordance with various embodiments, described herein are systems and methods for providing automated localization of software applications and graphical user interfaces.

A software extension or add-in component operates both as a design tool, and as a runtime process, for purposes of localizing a software application or its graphical user interface, including the translation of user-visible strings display-able within graphical user interface elements.

The translation manager can be used to automate the localization of a software application or workbook being developed, including during an extraction process, automatically identifying and associating user-visible strings with string keys.

When the workbook is subsequently accessed and used at runtime, for example by a business user working within a particular region or language, the extension or add-in can use the string keys to automatically map prepared-translations to the graphical user interface elements, for use in localizing the software application.

BRIEF DESCRIPTION OF THE DRAWINGS

FIG. 4 illustrates an example software application graphical user interface layout rendered in a base language, in accordance with an embodiment.

FIG. 9 illustrates an example fragment of a translation for a graphical user interface layout, in accordance with an embodiment.

FIG. 12 illustrates a method for providing automated localization of software applications and graphical user interfaces, in accordance with an embodiment.

DETAILED DESCRIPTION

Figure 1:
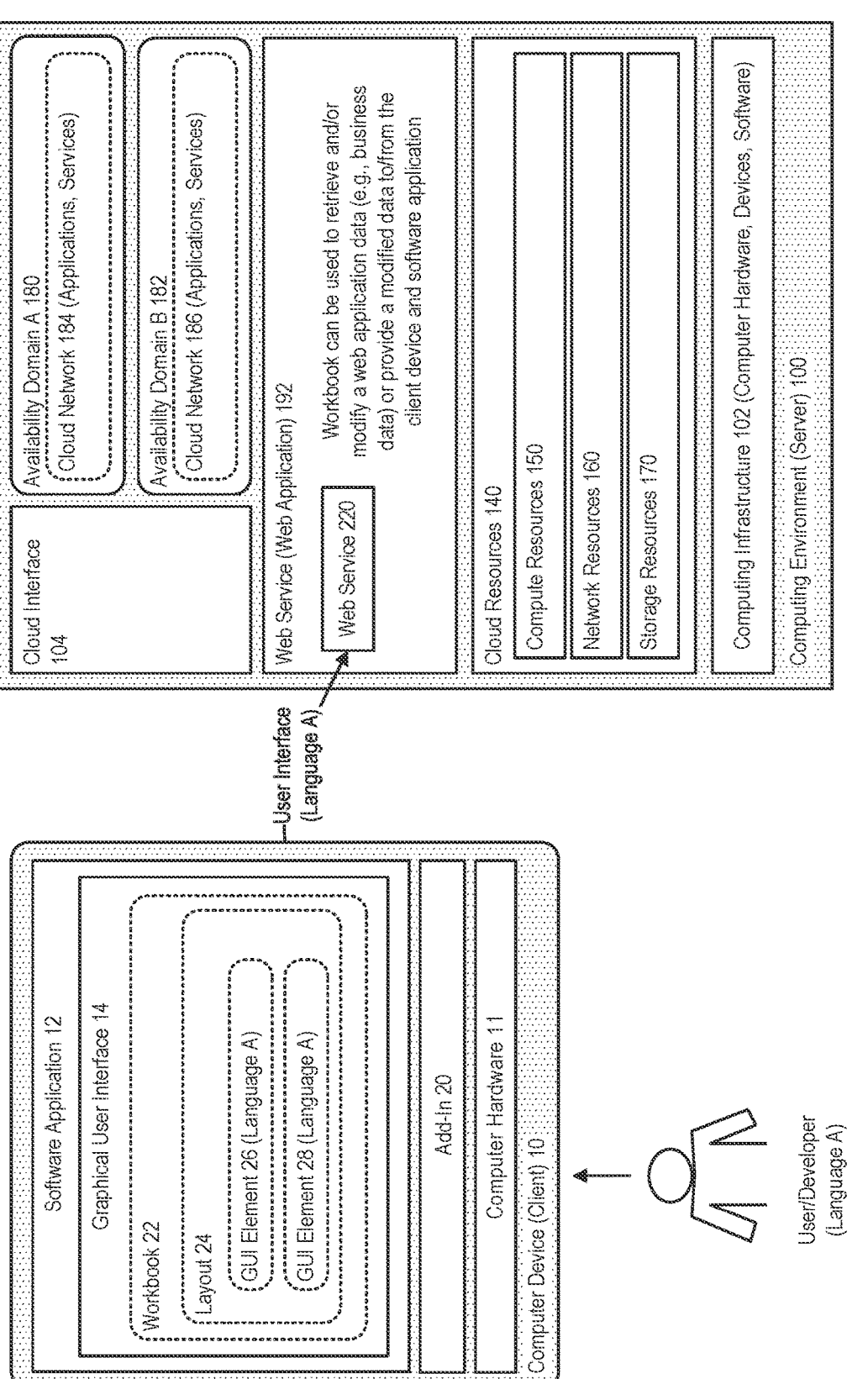
FIG. 1 illustrates a system for automated localization of software applications and graphical user interfaces, in accordance with an embodiment.

As described above, traditional approaches to software application localization are generally tedious, requiring much additional work on the part of the application developer, while being prone to error in preparing the translation and subsequent display of graphical user interface elements.

For example, in order to localize a particular software application, an application developer may be required to identify each user-visible element within the graphical user interface associated with the software application; extract the element manually to a resource bundle to be translated; and then in order to use the prepared-translations, bind each graphical user interface element, again manually one-by-one, to its corresponding translation.

In accordance with various embodiments, described herein are systems and methods for providing automated localization of software applications and graphical user interfaces.

A software extension or add-in component operates both as a design tool, and as a runtime process, for purposes of localizing a software application or its graphical user interface, including the translation of user-visible strings displayable within graphical user interface elements.

The translation manager can be used to automate the localization of a software application or workbook being developed, including during an extraction process, automatically identifying and associating user-visible strings with string keys.

When the workbook is subsequently accessed and used at runtime, for example by a business user working within a particular region or language, the extension or add-in can use the string keys to automatically map prepared-translations to the graphical user interface elements, for use in localizing the software application.

In accordance with an embodiment, advantages of the described approach include that it reduces the burden of additional work on the part of the application developer, and provides a faster and more accurate means of localizing software applications and graphical user interfaces.

In accordance with various embodiments, although many of the examples described herein illustrate how the software extension or add-in component, and the translation manager, can be used in localizing a spreadsheet-type software application or integration environment that uses workbooks, in accordance with various embodiments, the systems and methods described herein can be used with other types of software applications or graphical user interfaces, such as for example other types of web applications, or cloud-based applications, for purposes of providing automated localization of those software applications.

Automated Localization

In accordance with various embodiments, the system can include or utilize some or all of the following features:

Translation Manager (Add-In)—a software extension or add-in component, which is associated with a software application environment operating on a computer, and operates both as a design tool, and as a runtime process, for purposes of localizing the software application or its graphical user interface, including the translation of user-visible strings displayable within graphical user interface elements.

Integrated Workbook—a software application document that contains metadata that the software extension or add-in component can use to interact with a web service or integration environment, including a layout metadata that defines one or more graphical user interface layouts associated with the workbook. For example, in accordance with an embodiment, a workbook can be provided as a spreadsheet-type document.

Worksheet—a component of a workbook. For example, in accordance with an embodiment, a workbook can be provided as a spreadsheet-type document, and can include one or more worksheet tabs, each having one or more spreadsheets.

Business Object—a web service or other type of service or object, that can be provided within an integration environment and allows operations (e.g., GET, POST, PATCH, or DELETE operations) on a particular resource or object type. For example, in accordance with an embodiment, an expense reports object can be provided that allows operations to create or edit expense reports.

Layout—a binding of a business object to a worksheet, as defined by a workbook metadata, for purposes of allowing operations on the business object. For example, in accordance with an embodiment, a spreadsheet-type document can be associated with a table layout that operates as a binding that allows editing of invoices via a tabular invoice worksheet and an associated web service.

Localizable String—a user-visible string that is displayable within graphical user interface elements of a workbook, and is available for localization. For example, in accordance with an embodiment, in the example of a workbook provided as a spreadsheet-type document, a localizable string may be a table column header as displayed within a spreadsheet.

Figure 2:
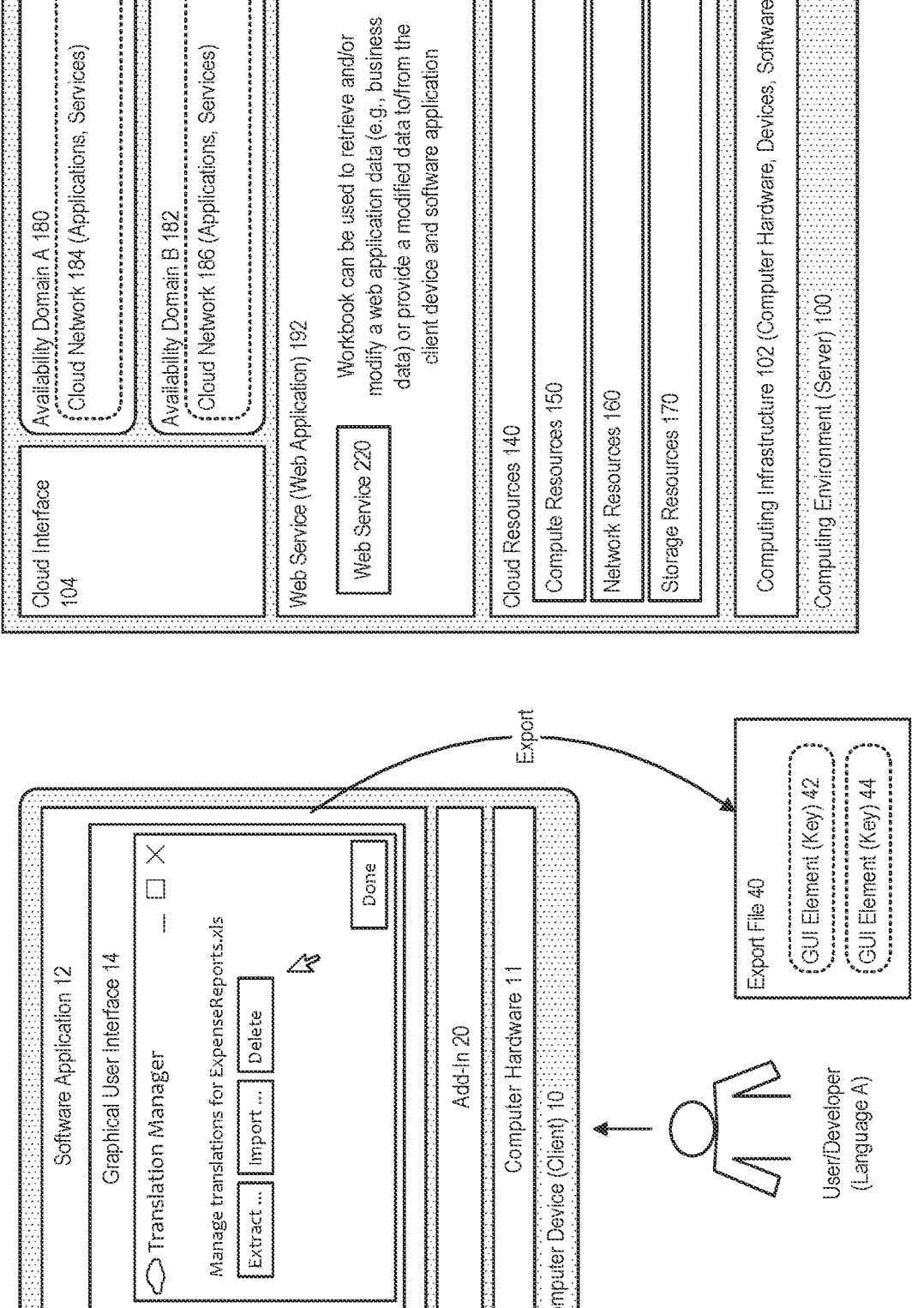
FIG. 2 further illustrates a system for automated localization of software applications and graphical user interfaces, in accordance with an embodiment.
Figure 3:
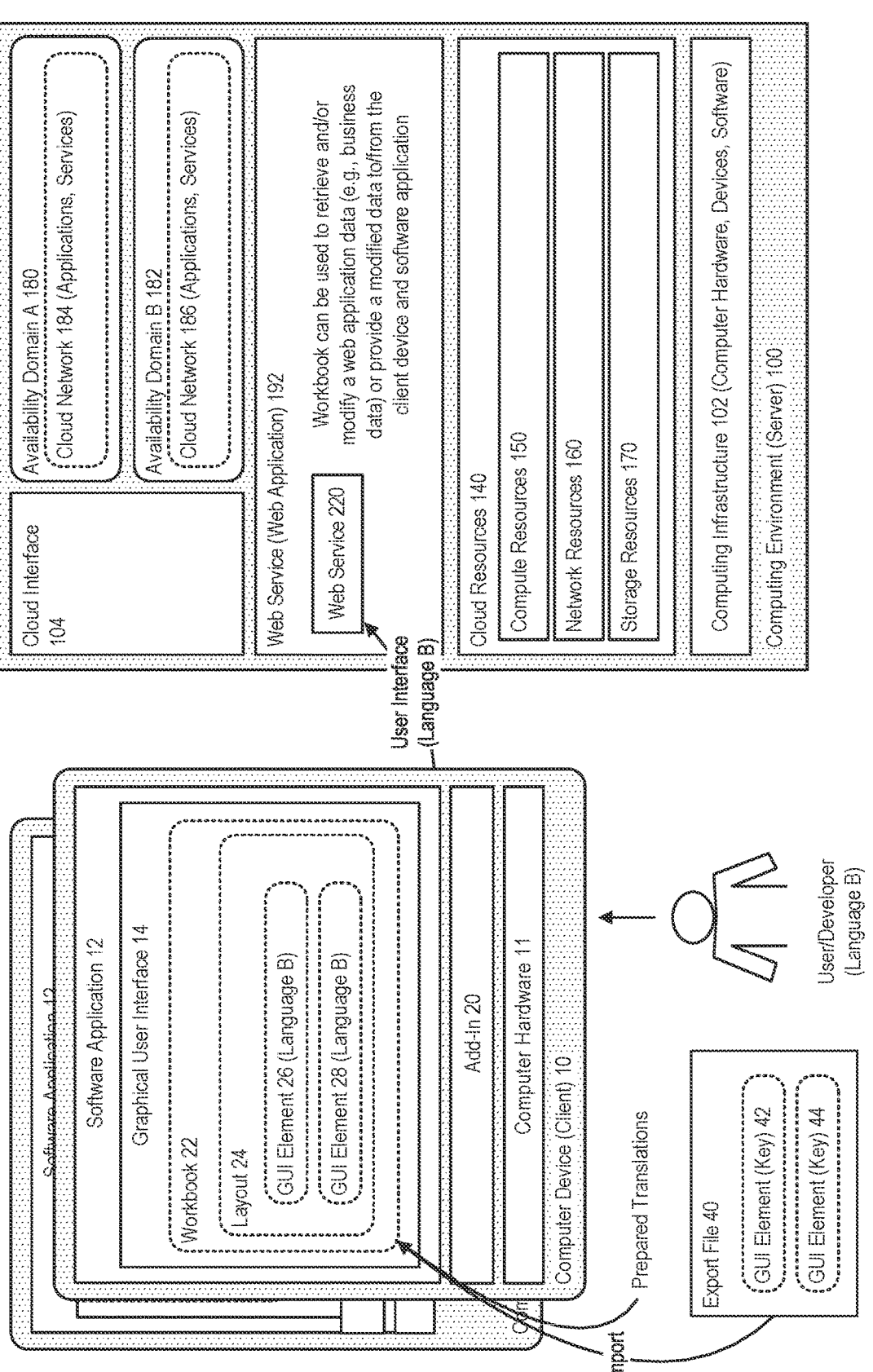
FIG. 3 further illustrates a system for automated localization of software applications and graphical user interfaces, in accordance with an embodiment.

FIGS. 1-3 illustrate a system for automated localization of software applications and graphical user interfaces, in accordance with an embodiment.

In accordance with an embodiment, the components and processes illustrated in FIGS. 1-3, and as further described herein with regard to various embodiments, can be provided as software or program code executable by a computer system or other type of processing device, for example a cloud computing system.

The examples illustrated therein are provided for purposes of illustrating a computing environment that can utilize automated localization. In accordance with other embodiments, the various components, processes, and automated localization features described herein can be used with other types of computing environments.

As illustrated in FIGS. 1-3, in accordance with an embodiment, a computing environment (e.g., a cloud environment, or server) 100 can operate on a computing infrastructure 102 comprising hardware (e.g., processor, memory), software resources, and provide a cloud interface 104 or other application program interface (API) that provides access to shared resources 140, such as, for example, a compute resources layer 150, a network resources layer 160, and/or a storage resources layer 170.

In accordance with an embodiment, the computing environment can support the use of availability domains, such as for example availability domains A 180, B 182, which enables customers to create and access cloud networks 184, 186, and run cloud instances.

In accordance with an embodiment, a client device, such as, for example, a computing device 10 having a device hardware 11 (e.g., processor, memory), a software application 12 (e.g., a spreadsheet application), and graphical user interface 14, can enable a user to communicate with the computing environment via network such as, for example, a wide area network, local area network, or the Internet, to access various applications, e.g., enterprise applications.

In accordance with an embodiment, a web service 220 operates to receive requests directed to one or more web applications 192.

For example, in accordance with an embodiment, a client device having a software application and graphical user interface can use a workbook or a software application document, for example a spreadsheet-type document, or other type of application document, to access a business object or web service to retrieve and/or provide a modified data to/from a web application.

In accordance with an embodiment, the web service can be, for example, a REST-based service, or other type of web service provided within an integration environment, that allows operations (e.g., GET, POST, PATCH, or DELETE operations) on a particular resource or object type (e.g., an expense reports object).

For example, in accordance with an embodiment, a business object can be provided and made accessible as a web service by an underlying service framework such as, for example, an Oracle REST Data Services environment, or a NetSuite environment, for other environment that allows client devices to communicate via web services and perform operations on associated business objects.

In accordance with an embodiment, an add-in 20 for use in software development can be provided, for example, as a software extension or add-in component, which operates both as a design tool, and as a runtime process, for purposes of localizing a software application or its graphical user interface, including the translation of user-visible strings displayable within graphical user interface elements.

In accordance with an embodiment, at design-time, during an extraction process, the add-in component operates as a translation manager to automatically identify (for example, within a workbook 22 and its associated layout 24) user-visible strings displayable within graphical user interface elements 26, 28, and associates such strings with string keys.

In accordance with an embodiment, examples of software application environments can include spreadsheet-type software application or integration environments that can use workbooks, such as, for example, a Microsoft Excel or other type of spreadsheet-type software application.

In accordance with an embodiment, examples of software extension or add-in components can include, for example, an Oracle Visual Builder Add-In for Excel (VBAFE) environment, configured as described herein, and which can be provided for use with a software application development environment, for purposes of developing workbooks.

In accordance with an embodiment, the workbook can be a software application document, for example a spreadsheet-type document, or other type of application document, that contains a catalog metadata that the software extension or add-in component can use to interact with a web service or other integration environment (for example, a REST-based service, or other type of web service), on behalf of a business user, together with a layout metadata that defines one or more graphical user interface layouts associated with the workbook.

In accordance with an embodiment, within a workbook, each layout provides a binding of a business object to a worksheet, as defined by a workbook metadata, for purposes of allowing operations on the business object, and defines one or more localizable strings as user-visible strings that are displayable within graphical user interface elements of the workbook.

In accordance with an embodiment, the translation manager traverses the layouts within the workbook, to gather or identify a list of localizable strings and their associated (catalog and layout) metadata, which is generally stored within each workbook in a hidden area of the workbook. The schema associated with the catalog and layout metadata is owned by the add-in; which allows the add-in to identify such user-visible strings for translation.

In accordance with an embodiment, the translation manager generates unique (e.g., globally unique identifier, GUID) string keys that are explicitly and internally bound to corresponding catalog or layout metadata items. The translation manager exports those strings which have been identified for translation to an export file 40, in a format which is convenient for translators to utilize in preparing translations. The export file includes, for each graphical user interface element 42, 44, identified for translation, the unique string key associated with the graphical user interface element, the original text string, and a context information that may be useful to translators.

In accordance with an embodiment, since the add-in component operating as a translation manager exports the translatable text strings, and owns the string keys, the application developer does not need to perform this work themselves. Later, when translations are made available, the translation manager can map the prepared-translations back to the corresponding graphical user interface elements, and store them internally inside the workbook. Subsequently, at runtime, the add-in component can then look up the appropriate translation by string key, in order to obtain translated layouts.

In accordance with an embodiment, each workbook (e.g., spreadsheet-type document, or other type of software application document) can be considered a stand-alone application; with its only dependencies being its associated web service, the software application environment (e.g., a Microsoft Excel or other type of spreadsheet-type software application environment), and the translation manager software extension or add-in component.

In accordance with an embodiment, the add-in works directly with the web service to fetch and update data for the business user. Integrated workbooks are self-contained in that the required metadata is contained within the workbook, and can be distributed via various channels, for example via a Customer Connect channel, or embedded in web applications. Software application developers, information technology consultants, and customers can install the add-in, to design, create and test spreadsheet integrations directly on their desktop, with no dependency on another IDE or development environment.

In accordance with an embodiment, the layout forms a basis for integration of the web service (e.g., a business object) and the worksheet; and defines the aspects of the integration. For example, it can contain the set of desired table columns and their order; which of the available operations are enabled; or search/filter criteria used at data download time. A workbook can have multiple worksheets; and each worksheet can have a single layout.

In accordance with an embodiment, when a business user opens a workbook in their software application environment (e.g., spreadsheet application environment), the add-in automatically displays the correct set of translations for the add-in's graphical user interface elements; while the layout strings are the responsibility of the workbook creator/owner.

In accordance with an embodiment, the initial set of field titles can be imported, for example, from an OpenAPI service description, along with other aspects of the business objects. A workbook creator/owner/developer/author may edit these strings to improve them for the target context; and can also supply additional strings that are not available from the service description.

Although some, e.g., REST, frameworks offer the ability to fetch a localized version of the service description, it may be incomplete; just as a web page may have strings not represented in the service description/metadata, so does the, e.g., spreadsheet layout.

In accordance with an embodiment, a client device can interrogate a web service to obtain web service metadata that determine one or more capabilities of that web service. For example, a client device 10 can send a request to a web service 220 requesting metadata, in response to which the web service can provide metadata describing which services, resources, or business objects that web service provides. The add-in can then use this information to configure a worksheet with a layout, for example to configure a spreadsheet-type document with a corresponding table component, based on the web service metadata. The table component can then be used to retrieve, display, edit, or communicate data within a spreadsheet, and upload user-made changes back to the web service.

In accordance with various embodiments, and for purposes of illustration, additional examples describing the use of a client device with a web service are provided in U.S. Pat. No. 11,138,371, issued on Oct. 5, 2021, the contents of which are herein incorporated by reference.

Figure 5:
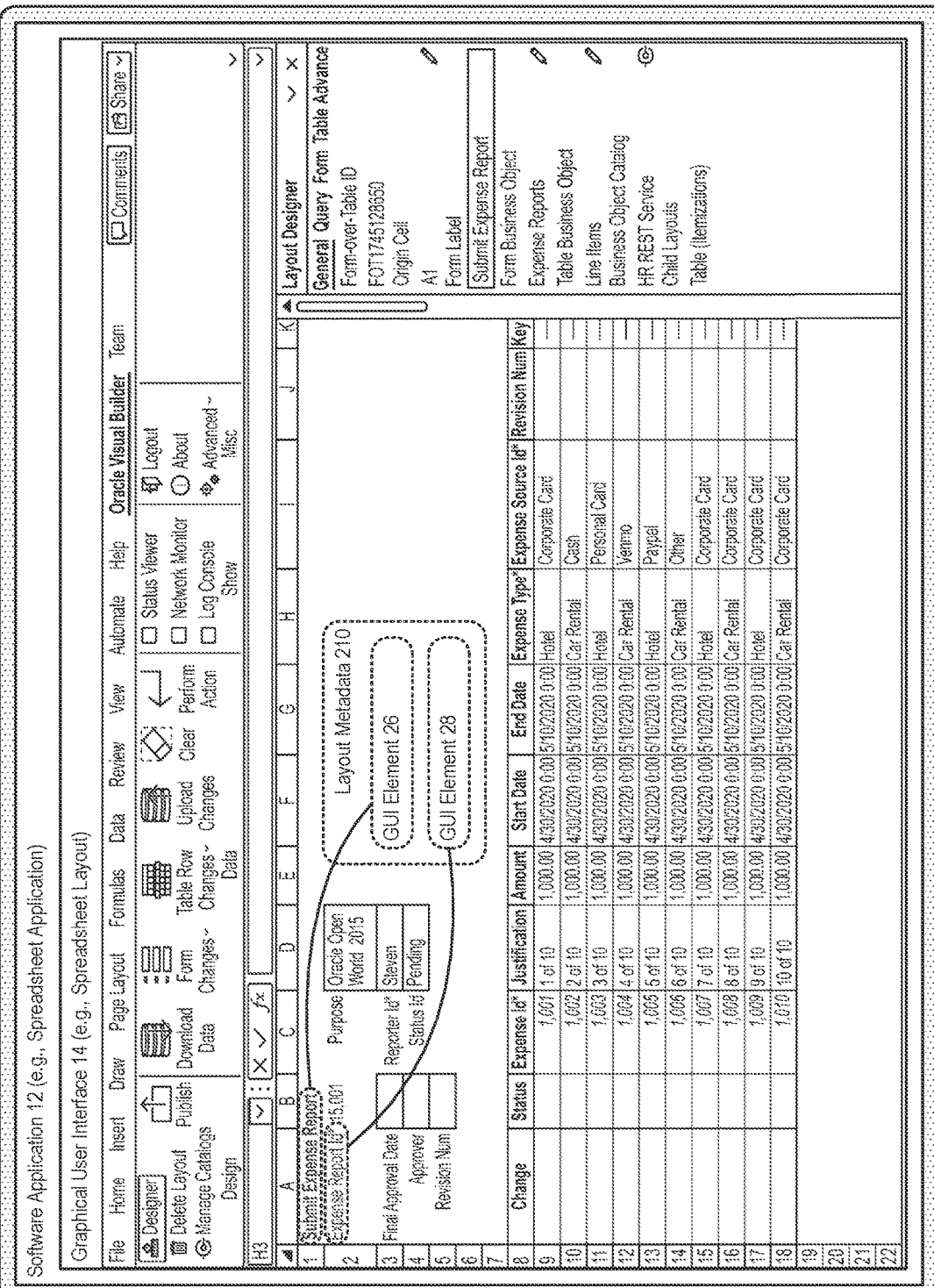
FIG. 5 further illustrates an example software application graphical user interface layout rendered in a base language, in accordance with an embodiment.
Figure 6:
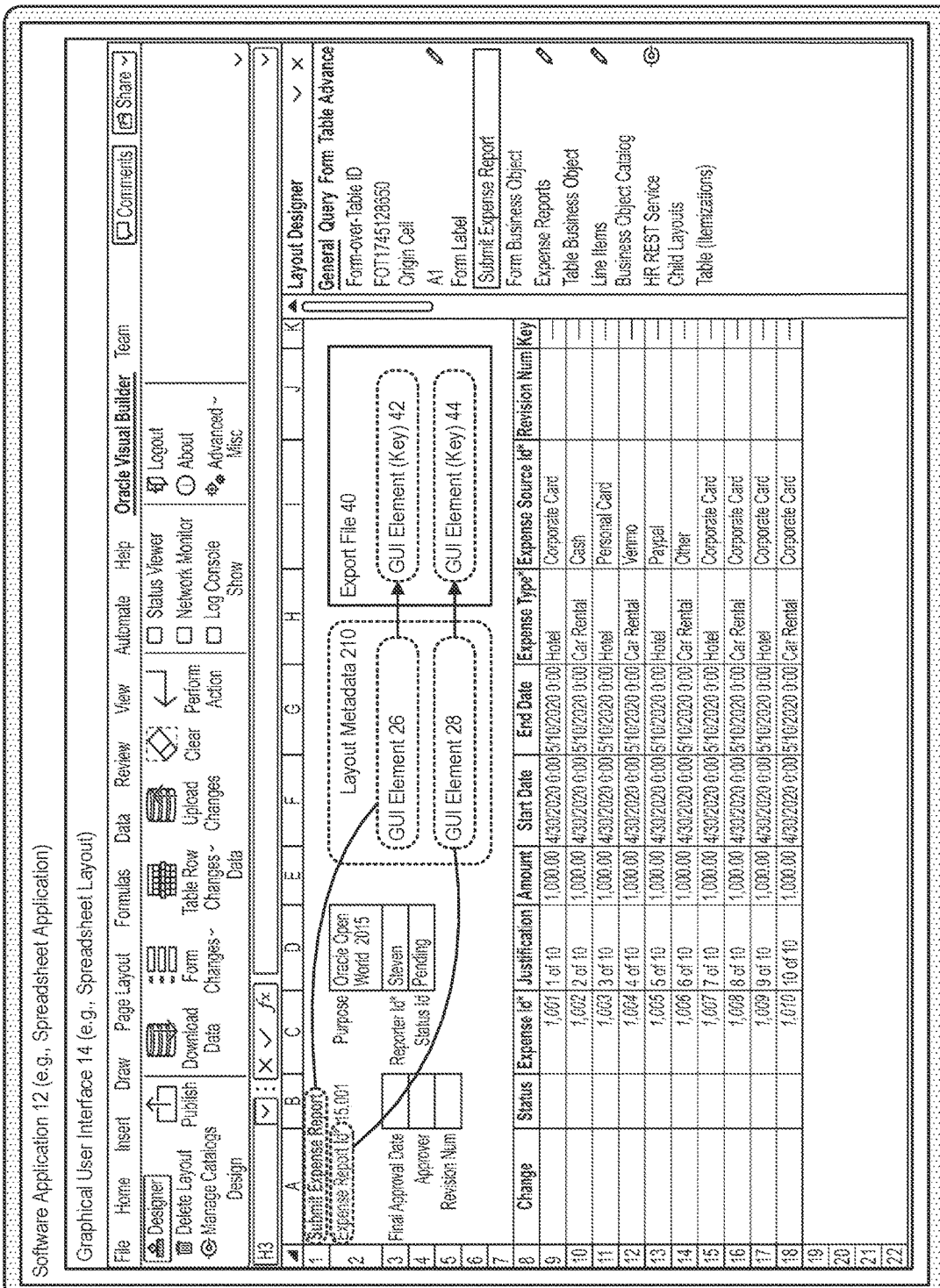
FIG. 6 further illustrates an example software application graphical user interface layout rendered in a base language, in accordance with an embodiment.

FIGS. 4-6 illustrate an example software application graphical user interface layout rendered in a base language (e.g., English, including form labels and column headers), in accordance with an embodiment.

As illustrated in FIGS. 4-6, in accordance with an embodiment, an integrated workbook, for example a spreadsheet-type document, contains a hidden layout metadata 210 that provides a binding of a web service-based business object to a worksheet, and enables the software extension or add-in component to interact with the web service or integration environment.

Figure 7:
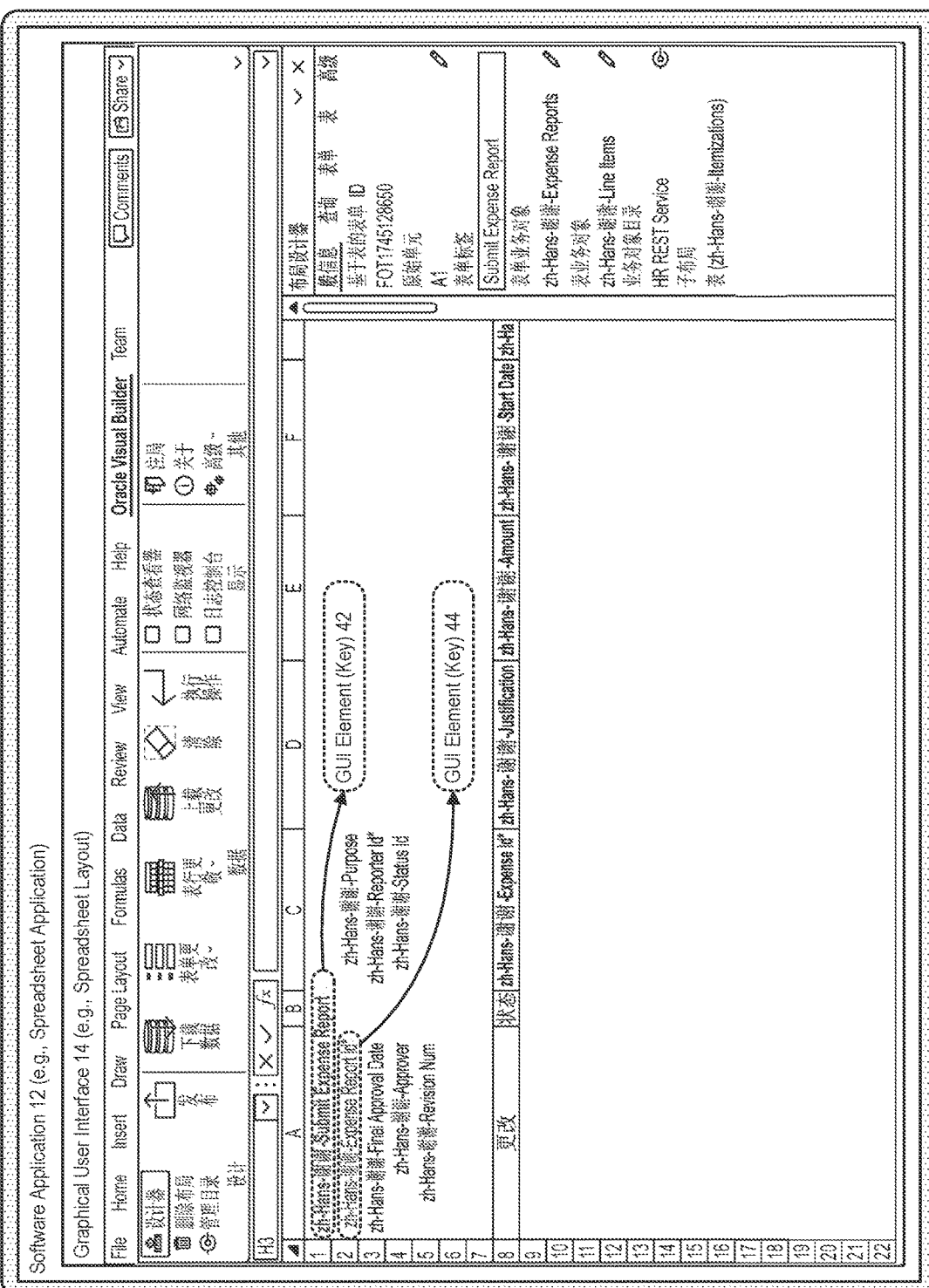
FIG. 7 illustrates an example software application graphical user interface layout rendered by the add-in configured for a given language, in accordance with an embodiment.
Figure 8:
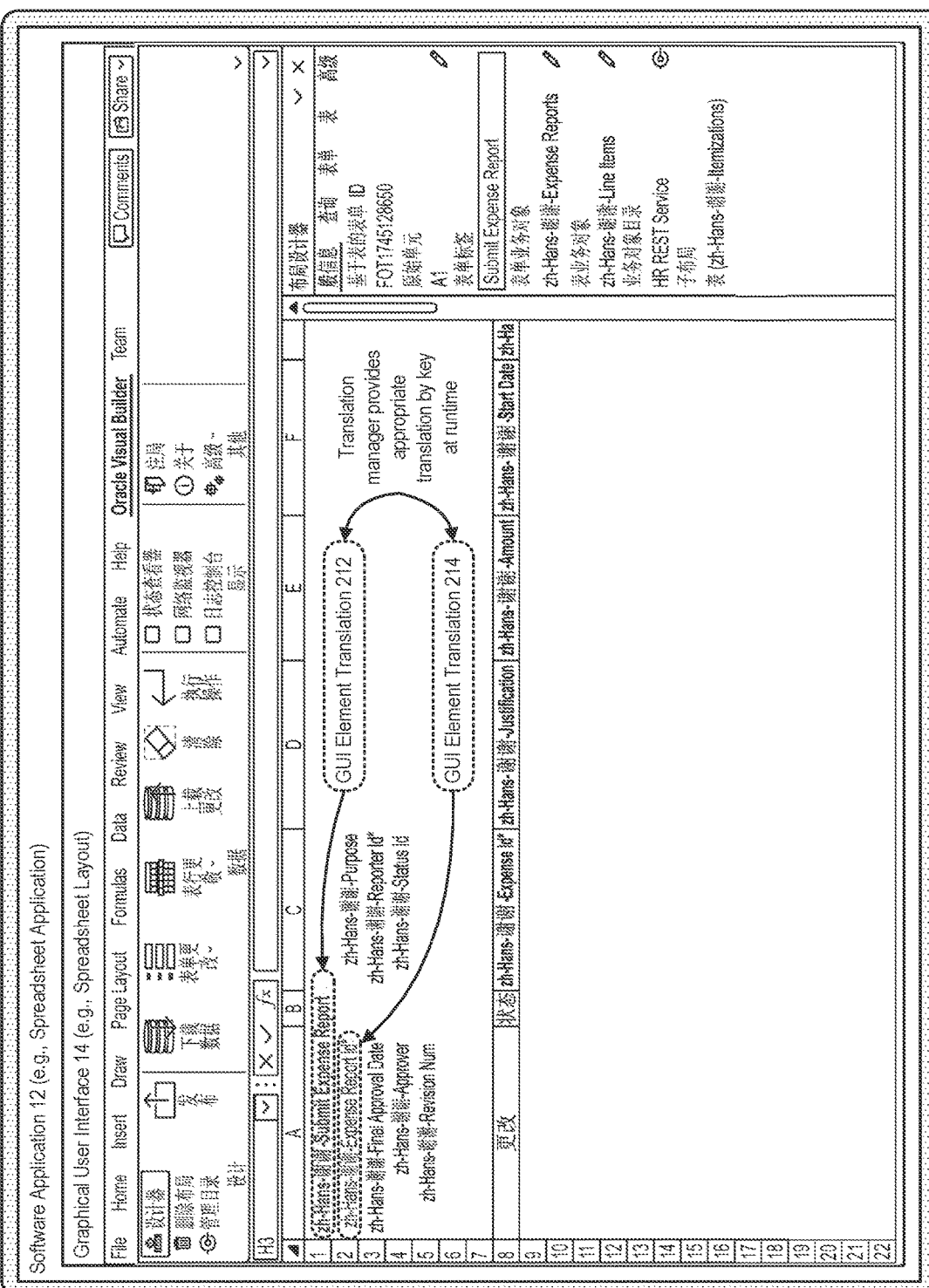
FIG. 8 further illustrates an example software application graphical user interface layout rendered for a given language, in accordance with an embodiment.

FIGS. 7-8 illustrate an example software application graphical user interface layout rendered by the add-in configured for a given language (e.g., Chinese), in accordance with an embodiment.

which strings are expected to be shown to business users. During the extraction process, it can identify all such strings automatically and generate appropriate string keys for translation, with no extra work by the application developer. The contents of the export file are translated, and a corresponding translation file is stored, for example within a content delivery network or other known storage location. The developer can then access or import the translation file and translations associated with the graphical user interface elements for use with the workbook. When the translation files are subsequently incorporated into a workbook, it can automatically map the keys back to the graphical user interface elements without a need for creating binding expressions.

Figure 10:
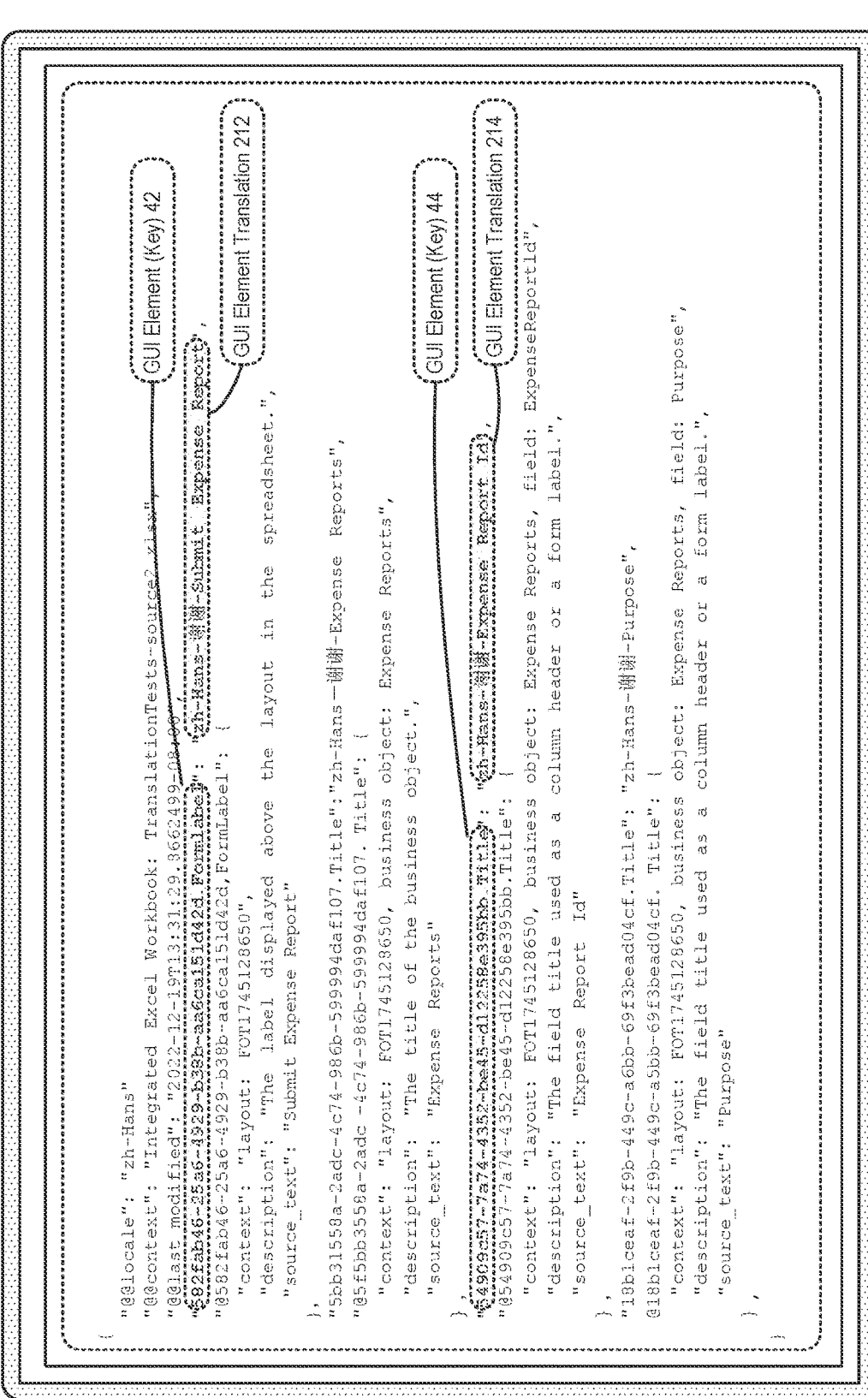
FIG. 10 further illustrates an example fragment of a translation for a graphical user interface layout, in accordance with an embodiment.

For example, as illustrated in FIGS. 9-10, an entry for a business object field "Title" in an Expense Reports workbook can be described in JSON format as:

```
"5bb31558a-2adc-4c74-986b-599994daf107. Title":"zh-Hans - 谢谢-Expense Reports",
"@5f5bb3558a-2adc -4c74-986b-599994daf107. Title": {
    "context": "layout: FOT1745128650, business object: Expense Reports",
    "description": "The title of the business object.",
    "source_text": "Expense Reports"
} ,
```

As illustrated in FIGS. 7-8, in accordance with an embodiment, during an extraction process, the translation manager automatically identifies user-visible strings displayable within graphical user interface elements, associates those strings with string keys, and stores them internally inside the workbook.

Since the software extension or add-in component owns the string keys, subsequently at runtime the software extension or add-in component can look up an appropriate translation for each graphical user interface element 212, 214 by string key, in order to obtain a translated layout.

For example, if a business user opens an integrated workbook for use with the Chinese language, the add-in can In the above example, the first line includes a string key (5bb31558a-2adc-4c74-986b-599994daf107.Title) and a translatable text string (zh-Hans- 谢谢 -Expense Reports). The key provides a unique ID for the string in the workbook; and its associated value is the actual text string that a translator will translate into the target language. Each key-value pair can include additional attributes to assist the translator understand how the string is being used in the workbook, for example, a context, description, or source text.

As illustrated in the example of FIGS. 9-10, a translation file can include global attributes (prefixed with @@) that apply to the translation file as a whole, for example:

```
{
    "@@locale": "zh-Hans"
    "@@context": "Integrated Excel Workbook: TranslationTests-source2.xlsx",
    "@@last_modified": "2022-12-19T13:31:29.8662499-08:00",
``` display icon labels, menu items, and buttons in the Chinese language. If the web service has been localized into Chinese, the add-in can retrieve and display Chinese language text for business object fields. If the workbook itself has been translated, the add-in can display Chinese language text for strings such as business object fields that may not have been translated in the service description.

FIGS. 9-10 illustrate an example fragment of a translation (e.g., in pseudo-Chinese) for a graphical user interface layout (e.g., in JSON), in accordance with an embodiment.

As illustrated in FIGS. 9-10, In accordance with an embodiment, the export file includes, for each graphical user interface element a graphical user interface element description 230, including the unique string key, the original text, and some context information that may be useful to translators.

In accordance with an embodiment, since the add-in has control over its graphical user interface elements, it knows In this example, the @@locale attribute provides a language code for the text strings stored in the file, here Simplified Chinese (zh-Hans). Following the translation process, this attribute value will be changed to indicate the (new) language for the translation file. When the translation file is subsequently accessed or imported for use with a workbook, the add-in can look to the value of @@locale to identify the language used for the translation file.

In accordance with an embodiment, such approach to automating the localization process avoids the need for tedious and error prone work by individual application developers. By managing the string keys, the translation manager can later map prepared-translations back to the graphical user interface elements, for use in localizing the software application, with less burden of additional work on the part of the application developer.

Figure 11:
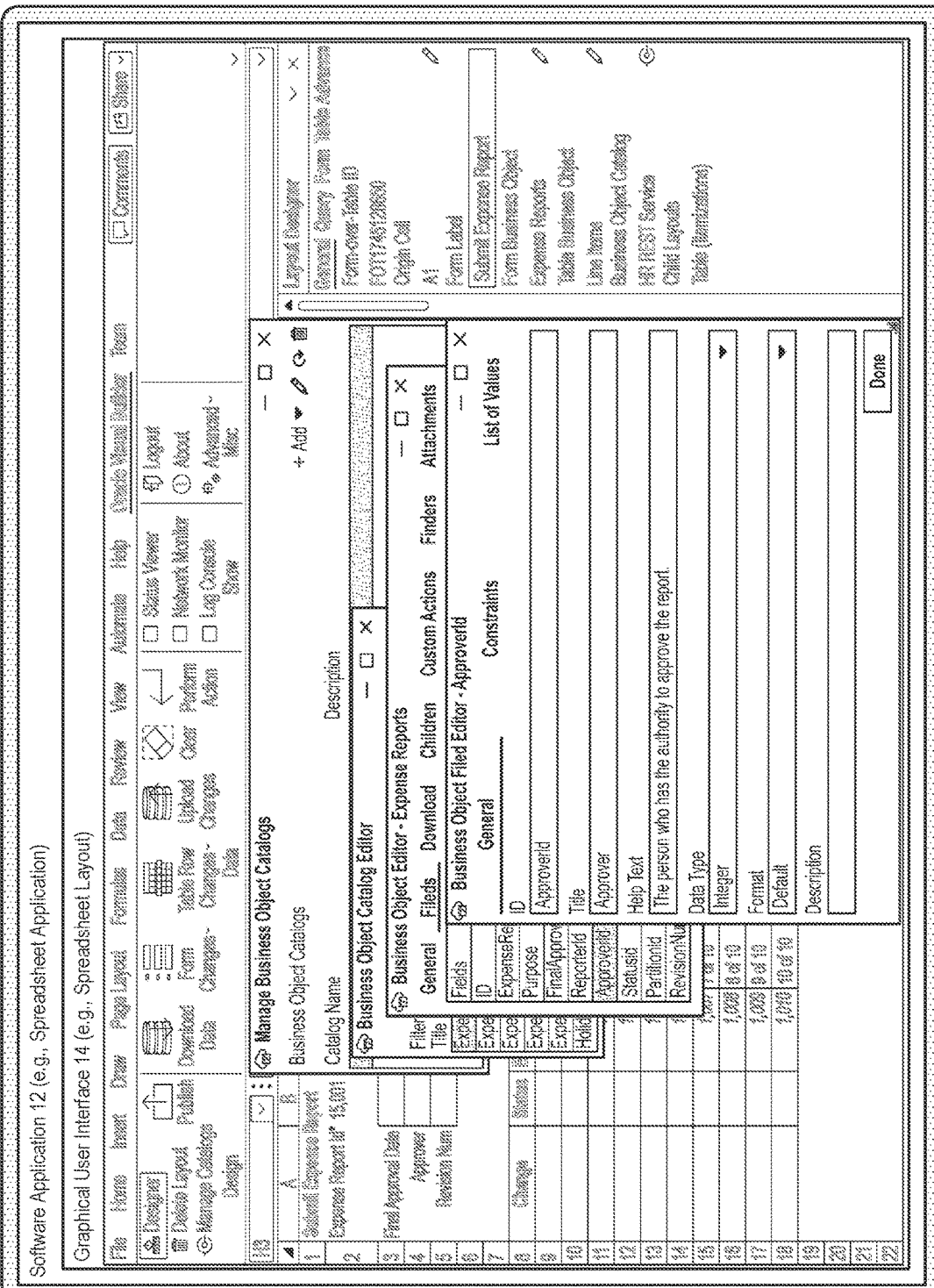
FIG. 11 illustrates another example of a software application graphical user interface layout, in accordance with an embodiment.

FIG. 11 illustrates another example of a software application graphical user interface layout, in accordance with an embodiment.

As illustrated in FIG. 11, in accordance with an embodiment, the above-described approach can be used, for example, to translate layout strings such as titles and other textual properties, as displayed in the illustrated field editor interfaces, from their base language values for display in a different language.

In accordance with various embodiments, although many of the examples described herein illustrate how the software extension or add-in component, and the translation manager, may be used with a web application or spreadsheet-type software application or integration environment that uses workbooks, in accordance with various embodiments, the systems and methods described herein can be used with other types of software applications or graphical user interfaces, such as for example other types of web applications, or cloud-based applications, for purposes of providing automated localization of those software applications.

Example Development Overview

FIG. 12 illustrates a method for providing automated localization of software applications and graphical user interfaces, in accordance with an embodiment.

As illustrated in FIG. 12, in accordance with an embodiment, the process can include:

At step 241, a workbook developer creates and tests an integrated workbook as usual.

At step 242, when the workbook has been prepared, a base translation file associated with the workbook and containing layout strings is exported, for example in a JSON format as an export file. The base translation or export file includes workbook-specific text strings such as field titles and help text which will be translated into one or more target languages.

At step 243, the base translation or export file is submitted to a translation process.

At step 244, as part of the translation process, a set of resultant translation files are published, for example to a content delivery network at a known storage location.

At step 245, the workbook developer registers the expected storage location of the translation files in a workbook configuration. In accordance with various embodiments, the translation files can either be stored and accessed remotely, for example within a content delivery network as described above, or alternatively can be imported and stored internally within the workbook.

At step 246, the workbook is distributed to the target audience.

At step 247, when a member of the target audience, for example a business user, opens the workbook for use within a particular culture or language, a software extension or add-in component fetches corresponding translations from the storage location, and renders graphical user interface layouts associated with the workbook.

In accordance with an embodiment, the system can include one base translation file per integrated workbook, for example as stored in a JSON structure, in English. The mapping of strings to graphical user interface elements is automatic and owned by the add-in; so, the workbook developer does not have to do any string resource binding.

Example Usage

In accordance with various embodiments, examples of software extension or add-in components can include, for example, an Oracle Visual Builder Add-In for Excel (VBAFE) environment configured as described herein, which provides a framework that allows workbook developers to integrate workbooks (e.g., spreadsheets) with web services.

In accordance with an embodiment, the process by which a workbook developer can provide automatic localization, using VBAFE as an example, includes:

1. The application developer uses VBAFE to configure and test a workbook as desired.
2. Within the VBAFE environment, a menu allows a "Manage Translations" option to be selected; while an "Export" option allows the corresponding JSON export file to be saved to a folder of their choice.
3. This export file is submitted to a translation team or process (for example, by checking it into a source control system and registering it for translation). The developer then waits for the translation process to complete.
4. Once the translation process has completed, the developer can select the "Manage Translations" option from the "Advanced" menu in the Oracle Visual Builder tab; and select the "Import" option to browse and select the translation files to import.
5. The developer can then save and/or publish the workbook; or distribute the workbook to customers.

In accordance with an embodiment, the process by which a business user receiving a localized workbook can then use the workbook includes opening the workbook; and clearing the layouts to force them to be redrawn in the desired language/culture.

In accordance with an embodiment, a user may be prompted to redraw the layouts automatically. By default, the add-in uses the same language (for example, the language as presently being used by Excel). Optionally, the user can choose a different preferred language using an option "Advanced—Select Language".

In accordance with an embodiment, the translation file format can be provided as Application Resource Bundle (ARB) or other format that stores the workbook's translatable strings for a given language. Each translatable string is stored in a key-value pair and includes additional attributes that help you and your translators understand the context. Translation files cannot be shared between workbooks, since the string keys are unique GUID values that are different in each workbook. The add-in only exports the localizable strings that are currently used by the layouts. If the configuration of the workbook is changed, the process above can be repeated to pick up any new strings.

In accordance with an embodiment, on import, the add-in references a value of "@@locale" to identify the locale/language/culture of the translations. If the add-in cannot find a translation for a given string key/language, the base value is used instead; for example as may be indicated by a Help Text value in the Field Editor.

Localizable Properties

In accordance with an embodiment, any workbook property value (catalog or layout) that is displayed to business users must be included in this process; examples include: Field Title and Help Text; Custom Action Title and Help Text (and the payload fields); Row Finder Title and Help Text (and the finder variables); and the Form Label in a Form-over-Table layout.

Automatic Binding

In accordance with an embodiment, since the add-in uses unique GUID values to track the translations, the workbook developer does not have to do any binding or write any resource expressions to connect a translation to a given property; the process is instead performed automatically by the system.

Automatic Redraw

In accordance with an embodiment, the add-in tracks the last language used in each integrated workbook. When the workbook is opened, the add-in checks for a difference between the last language used and the add-in's current preferred language; and if they are different, offers to redraw all layouts.

In accordance with an embodiment, when the redraw occurs, the add-in may or may not have translations available for the current preferred language. If no translations are available, the base definitions are used instead.

In accordance with various embodiments, the teachings herein can be implemented using one or more computer, computing device, machine, or microprocessor, including one or more processors, memory and/or computer readable storage media programmed according to the teachings herein. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, ROMs, RAMs, EPROMS, EEPROMs, DRAMs, VRAMs, flash memory devices, or other types of storage media or devices suitable for non-transitory storage of instructions and/or data.

The foregoing description has been provided for the purposes of illustration and description. It is not intended to be exhaustive or to limit the scope of protection to the precise forms disclosed. Further modifications and variations will be apparent to the practitioner skilled in the art.

The embodiments were chosen and described in order to best explain the principles of the teachings herein and their practical application, thereby enabling others skilled in the art to understand the various embodiments and with various modifications that are suited to the particular use contemplated. It is intended that the scope be defined by the following claims and their equivalents.

What is claimed is:

1. A system for automated localization of software applications and graphical user interfaces, comprising:

a computer including a processor, and a software development environment provided thereon; and an add-in component that operates with the software development environment to provide localization of a software application, including operating as a translation manager to:

automatically identify, within a layout associated with a software application document, user-visible strings displayable within graphical user interface elements, wherein the layout is associated with a workbook metadata, and defines one or more localizable strings as the user visible strings that are displayable within the graphical user interface elements of the workbook;

associate such user-visible strings with unique string keys, including traversing the layout to identify a list of localizable strings and their associated metadata, and generating the unique string keys that are bound to corresponding layout metadata items; and export the localizable strings which have been identified for translation to an export file for use in preparing translations;

wherein prepared-translations are subsequently mapped back to the graphical user interface elements, based on associating the user-visible strings displayable within graphical user interface elements with the unique string keys, for use in localizing the software application.

2. The system of claim 1, wherein the add-in component is used with a workbook-oriented software application or integration environment and operates as a design tool and a runtime for purposes of localizing a workbook for use with the workbook-oriented software application or integration environment.

3. The system of claim 2, wherein during an extraction process, the translation manager automatically identifies and associated the user-visible strings with the string keys, wherein when the software application is subsequently accessed and used at runtime, the add-in component uses the string keys to automatically map the prepared-translations to the graphical user interface elements.

4. The system of claim 3, wherein the software application includes a workbook or other software application document that contains a metadata that the add-in component uses to interact with a web service or the integration environment on behalf of a business user.

5. The system of claim 4, wherein the software application is one of a web application, or a cloud-based or other software application.

6. A method for providing automated localization of software applications and graphical user interfaces, comprising:

providing, at a computer, a software development environment; and performing a localization of a software application, including:

automatically identifying, by add-in component operating as a translation manager, within a layout associated with a software application document, user-visible strings displayable within graphical user interface elements, wherein the layout is associated with a workbook metadata, and defines one or more localizable strings as the user visible strings that are displayable within the graphical user interface elements of the workbook;

associating such user-visible strings with unique string keys, including traversing the layout to identify a list of localizable strings and their associated metadata, and generating the unique string keys that are bound to corresponding layout metadata items; and exporting the localizable strings which have been identified for translation to an export file for use in preparing translations;

wherein prepared-translations are subsequently mapped back to the graphical user interface elements, based on associating the user-visible strings displayable within graphical user interface elements with the unique string keys, for use in localizing the software application.

7. The method of claim 6, wherein the add-in component is used with a workbook-oriented software application or integration environment and operates as a design tool and a runtime for purposes of localizing a workbook for use with the workbook-oriented software application or integration environment.

8. The method of claim 7, wherein during an extraction process, the translation manager automatically identifies and associated the user-visible strings with the string keys, wherein when the software application is subsequently accessed and used at runtime, the add-in component uses the string keys to automatically map the prepared-translations to the graphical user interface elements.

9. The method of claim 8, wherein the software application includes a workbook or other software application document that contains a metadata that the add-in component uses to interact with a web service or the integration environment on behalf of a business user.

10. The method of claim 9, wherein the software application is one of a web application, or a cloud-based or other software application.

11. A non-transitory computer readable storage medium having instructions thereon, which when read and executed by a computer cause the computer to perform a method comprising:

providing, at the computer, a software development environment; and performing a localization of a software application, including:

automatically identifying, by add-in component operating as a translation manager, within a layout associated with a software application document, user-visible strings displayable within graphical user interface elements, wherein the layout is associated with a workbook metadata, and defines one or more localizable strings as the user visible strings that are displayable within the graphical user interface elements of the workbook;

associating such user-visible strings with unique string keys, including traversing the layout to identify a list of localizable strings and their associated metadata, and generating the unique string keys that are bound to corresponding layout metadata items; and exporting the localizable strings which have been identified for translation to an export file for use in preparing translations;

wherein prepared-translations are subsequently mapped back to the graphical user interface elements, based on associating the user-visible strings displayable within graphical user interface elements with the unique string keys, for use in localizing the software application.

12. The non-transitory computer readable storage medium of claim 11, wherein the add-in component is used with a workbook-oriented software application or integration environment and operates as a design tool and a runtime for purposes of localizing a workbook for use with the workbook-oriented software application or integration environment.

13. The non-transitory computer readable storage medium of claim 12, wherein during an extraction process, the translation manager automatically identifies and associated the user-visible strings with the string keys, wherein when the software application is subsequently accessed and used at runtime, the add-in component uses the string keys to automatically map the prepared-translations to the graphical user interface elements.

14. The non-transitory computer readable storage medium of claim 13, wherein the software application includes a workbook or other software application document that contains a metadata that the add-in component uses to interact with a web service or the integration environment on behalf of a business user.

15. The non-transitory computer readable storage medium of claim 14, wherein the software application is one of a web application, or a cloud-based or other software application.

16. The system of claim 1, wherein the export file includes, for each graphical user interface element identified for translation, the unique string key associated with the graphical user interface element, an original text string, and a context information.

17. The system of claim 1, wherein the contents of the export file are translated, and a corresponding translation file includes translations associated with the graphical user interface elements for use with the workbook, wherein translation files are subsequently incorporated into a workbook, the add-in component automatically maps the keys back to the graphical user interface elements to provide the translations associated with the graphical user interface elements.

18. The method of claim 6, wherein the export file includes, for each graphical user interface element identified for translation, the unique string key associated with the graphical user interface element, an original text string, and a context information.

19. The method of claim 6, wherein the contents of the export file are translated, and a corresponding translation file includes translations associated with the graphical user interface elements for use with the workbook, wherein translation files are subsequently incorporated into a workbook, the add-in component automatically maps the keys back to the graphical user interface elements to provide the translations associated with the graphical user interface elements.

20. The non-transitory computer readable storage medium of claim 11, wherein the export file includes, for each graphical user interface element identified for translation, the unique string key associated with the graphical user interface element, an original text string, and a context information;

wherein the contents of the export file are translated, and a corresponding translation file includes translations associated with the graphical user interface elements for use with the workbook, wherein translation files are subsequently incorporated into a workbook, the add-in component automatically maps the keys back to the graphical user interface elements to provide the translations associated with the graphical user interface elements.

* * * * *